United States Patent
Satti et al.

(10) Patent No.: US 10,783,175 B2
(45) Date of Patent: Sep. 22, 2020

(54) EXPANDING SEARCH QUERIES USING QUERY TERM WEIGHTING

(71) Applicant: Microsoft Technology Licensing, LLC, Redmond, WA (US)

(72) Inventors: Sanjay Reddy Satti, Amherst, MA (US); Raghavan Muthuregunathan, Sunnyvale, CA (US); Abhimanyu Lad, San Mateo, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 133 days.

(21) Appl. No.: 16/146,959

(22) Filed: Sep. 28, 2018

(65) Prior Publication Data

US 2020/0104415 A1 Apr. 2, 2020

(51) Int. Cl.
*G06F 16/332* (2019.01)
*G06F 16/951* (2019.01)
*G06F 16/33* (2019.01)
*G06F 16/9038* (2019.01)

(52) U.S. Cl.
CPC ...... *G06F 16/3325* (2019.01); *G06F 16/3334* (2019.01); *G06F 16/9038* (2019.01); *G06F 16/951* (2019.01)

(58) Field of Classification Search
CPC ............. G06F 16/9038; G06F 16/4393; G06F 16/90332; G06F 16/9535; G06F 16/3325; G06F 16/951; G06F 16/3334
See application file for complete search history.

(56) References Cited

U.S. PATENT DOCUMENTS

| | | | |
|---|---|---|---|
| 2005/0234953 A1* | 10/2005 | Zhang | G06F 16/3346 |
| 2007/0050351 A1* | 3/2007 | Kasperski | G06F 16/951 |
| 2008/0140699 A1* | 6/2008 | Jones | G06F 16/3325 |
| 2012/0158765 A1* | 6/2012 | Kumar | G06F 16/3325 707/766 |
| 2012/0278339 A1* | 11/2012 | Wang | G06F 16/29 707/748 |
| 2015/0169576 A1* | 6/2015 | Panda | G06F 16/3326 707/723 |

* cited by examiner

*Primary Examiner* — Cam Y T Truong
(74) *Attorney, Agent, or Firm* — Schwegman Lundberg & Woessner, P.A.

(57) ABSTRACT

Disclosed are systems, methods, and non-transitory computer-readable media for expanding search queries using query term weighting. A search system receives a search term comprising multiple keywords and executes a search query based on the search term. In response to determining that the number of search results is less than a threshold number, the search system determines, based on historical query reformulation data, weight values for the keywords included in the search term. The weight values indicate a probability that each respective keyword would be removed when reformulating the search term. The search system generates a reformulated search term based on the weight values and executes a second search query based on the reformulated search term. The search system causes presentation of at least a portion of the search results on a client device of the requesting user.

18 Claims, 7 Drawing Sheets

EXPANDING SEARCH QUERIES USING QUERY TERM WEIGHTING

TECHNICAL FIELD

An embodiment of the invention relates generally to search queries and, more specifically, to expanding search queries using query term weighting.

BACKGROUND

Current web services enable users to access a large amount of data. For example, web services that provide job listings allow users to access thousands of available job listings. As another example, a web service that provides member profiles allows a recruiter to access thousands of candidate profiles. While these types of web services provide a large amount of available data, finding relevant data can be difficult. To alleviate this issue, many systems provide search functionality that allows users to formulate search queries to identify subsets of the data that are pertinent to the requesting user. For example, these systems may allow a user to enter search teens consisting of keywords to define the limitations of a search query. While these types of search queries allow a user to target their search for relevant information, in some instances they may result in only a few or even no results. Further, a user may be uncertain on how to properly broaden their search to identify relevant data. From a user's perspective, this can be very frustrating, and may lead to the user abandoning use of the service. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of various embodiments of the invention. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for expanding search queries using query term weighting. Current search systems enable users to provide search terms to identify relevant data. For example, search systems often enable users to enter a search term consisting of one or more keywords, which the search system uses to execute a search query for relevant data. Hence, a user searching for Italian restaurants may enter a search term such as "Italian restaurants." The search system uses the search term (i.e., Italian restaurants) to identify relevant data (e.g., webpages, restaurant listing, etc.) that has been tagged with and/or includes the search term or the individual keywords (i.e., Italian, and restaurants), which are returned to the user as search results.

While use of search term results many times results in relevant search results, it also greatly reduces the number of search results that a user receives. For example, entering a search term such as "Italian restaurants within 10 miles" provides relevant search results, however there are many more Italian restaurants than only those within a 10 mile radius. Likewise, there are many more restaurants within the 10 mile radius than just Italian restaurants. Accordingly, in some cases the provided search term may result in very few or even no search results being returned. In this type of scenario, users have traditionally been tasked with adjusting their chosen search term, which requires a user to guess how to modify the search term to receive the search results they desire.

To alleviate this issue, a search system executes a second search query when the number of search results from a first search query are less than a specified threshold number. The search system executes the second search query based on a reformulated search term that is broader than the original search term, and therefore may result in a higher number of search results. The search system generates the reformulated search term using determined weight values for each of the keywords in the initial search term. Each weight value indicates a probability that the corresponding keyword would be removed by a user when reformulating the search term. For example, the search system removes the keywords that have a high probability of being removed when reformulation a search. Accordingly, the user is not tasked with reformulating the search term themselves. As an example, the search system may reformulate the search term "Italian restaurants within 10 miles" to "Italian restaurant," which should result in more search results that the initial search term.

The search system determines the weight values for the keywords in a search term based on historical query reformulation data. The historical query reformulation data includes reformulated search query pairs that were identified from historical search queries (i.e., previously executed search queries). Each reformulated search query pair includes an initial search query and a subsequent search query, in which the subsequent search query was subsequent to the initial search query, and the search term in the subsequent search query includes a subset of the keywords from the search term used in the initial search query. Accordingly, each reformulated search query pair indicates an incident of a user manually generating a reformulated search term.

The search system uses the reformulated search query pairs as training data to generate a statistical model. Once generated, the statistical model receives as input a search term and outputs weight values for the keywords included in the search term. Other aspects of the various embodiments of the invention will be readily apparent from the description of the figures that follows.

Figure 1:
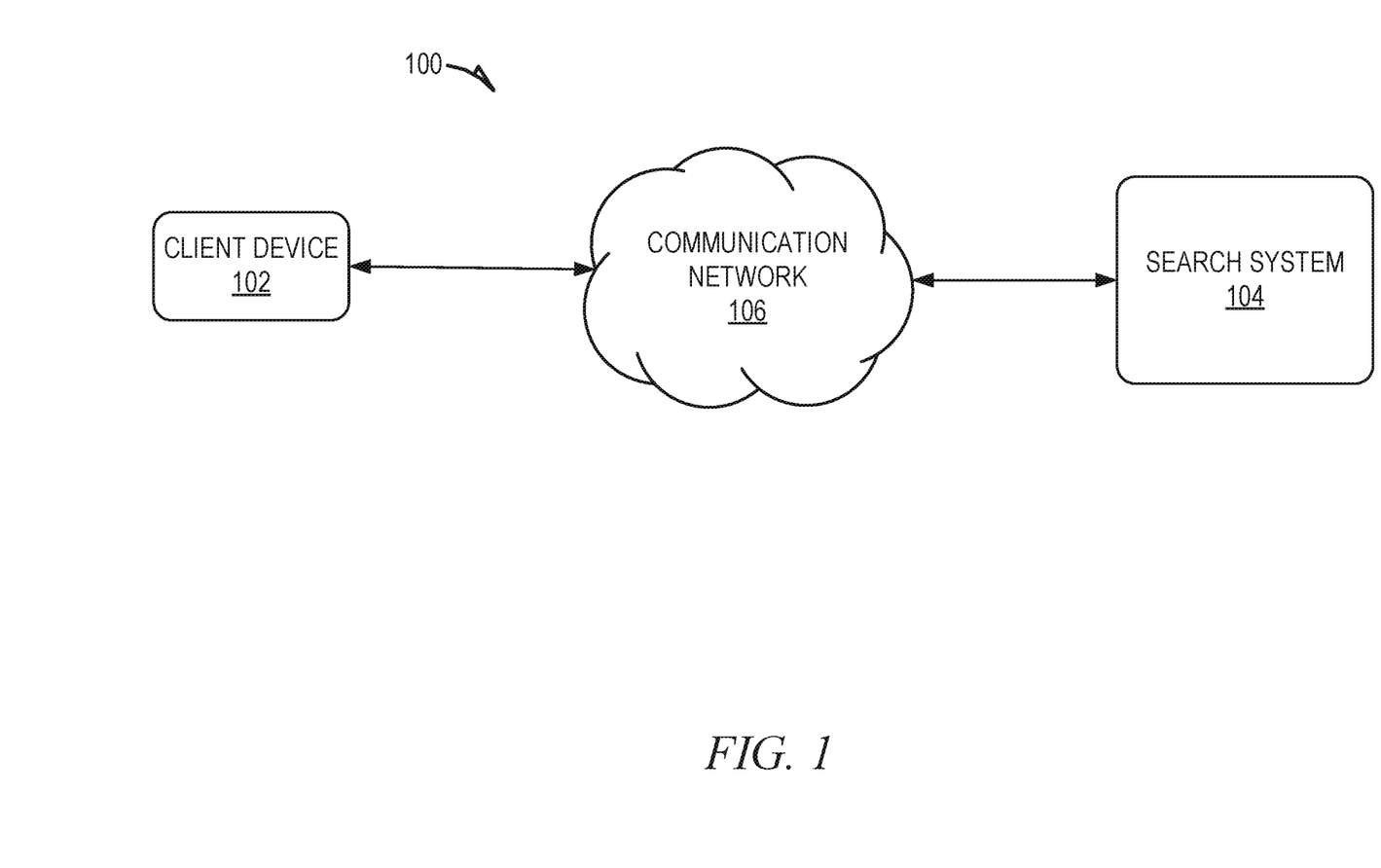
FIG. 1 shows a system configuration, wherein electronic devices communicate via a network for purposes of exchanging data, according to some example embodiments.

FIG. 1 shows an example system configuration 100, wherein electronic devices communicate via a network for purposes of exchanging data, according to some example embodiments. As shown, multiple devices (i.e., a client device 102 and a search system 104) are connected to a communication network 104 and configured to communicate with each other through use of the communication network 104. The communication network 104 is any type of network, including a local area network ("LAN"), such as an intranet, a wide area network ("WAN"), such as the Internet, or any combination thereof. Further, the communication network 104 may be a public network, a private network, or a combination thereof. The communication network 104 is implemented using any number of communication links associated with one or more service providers, including one or more wired communication links, one or more wireless communication links, or any combination thereof. Additionally, the communication network 104 is configured to support the transmission of data formatted using any number of protocols.

Multiple computing devices can be connected to the communication network 104. A computing device is any type of general computing device capable of network communication with other computing devices. For example, a computing device can be a personal computing device such as a desktop or workstation, a business server, or a portable computing device, such as a laptop, smart phone, or a tablet Personal Computer (PC). A computing device can include some or all of the features, components, and peripherals of the machine 700 shown in FIG. 7.

To facilitate communication with other computing devices, a computing device includes a communication interface configured to receive a communication, such as a request, data, etc., from another computing device in network communication with the computing device and pass the communication along to an appropriate processing module executing on the computing device. The communication interface also sends a communication (e.g., transmits data) to other computing devices in network communication with the computing device.

In the system 100, users interact with the search system 104 to execute search queries for data. For example, a user uses the client device 102 connected to the communication network 106 by direct and/or indirect communication to communicate with and utilize the functionality of the search system 104. Although the shown system 100 includes only one client device 102, this is only for ease of explanation and is not meant to be limiting. One skilled in the art would appreciate that the system 100 can include any number of client devices 102. Further, the search system 104 may concurrently accept connections from and interact with any number of client devices 102. The search system 104 supports connections from a variety of different types of client devices 102, such as desktop computers; mobile computers; mobile communication devices, e.g. mobile phones, smart phones, tablets; smart televisions; set-top boxes; and/or any other network-enabled computing devices. Hence, the client device 102 may be of varying type, capabilities, operating systems, etc.

A user interacts with the search system 104 via a client-side application installed on and executing at the client device 102. In some embodiments, the client-side application includes a search system specific component. For example, the component may be a stand-alone application, one or more application plug-ins, and/or a browser extension. However, the users may also interact with the search system 104 via a third-party application, such as a web browser, that resides on the client device 102 and is configured to communicate with the search system 104. In either case, the client-side application presents a user interface (UI) for the user to interact with the search system 104. For example, the user interacts with the search system 104 via a client-side application integrated with the file system or via a webpage displayed using a web browser application.

The search system 104 comprises one or more computing devices configured to execute user specified search queries for data and provide any resulting search results to the user. The search system 104 can be a standalone system or integrated into other systems or services, such as being integrated into a website, web service, etc. For example, the search system 104 may be integrated into a professional social networking service and used to facilitate search queries for job postings maintained by the professional social networking service. In either case, the search system 104 facilitates search queries for data, where a user using a client device 102 can enter search parameters for the search query and receive any resulting search results.

The search system 104 enables a user to execute a search query for data maintained by the search system 104 and/or data maintained by other data sources (not shown) in network communication with the search system 104. For example, the search system 104 provides the user with a search interface that enables the user to provide a search term upon which a search query is executed. A search term comprises one or more keywords provided by the user. For example, a search term may include single keyword, such as "restaurants," or multiple keywords, such as "Italian restaurants within 10 miles."

in response to receiving a search term from a client device 102, the search system 104 executes a search query based on the search term. For example, the search system 104 searches data in a data storage maintained by the search system 104 and/or web service in which the search system 104 is integrated. The search system 104 may also search data stored by other data sources. The search system 104 provides any resulting search results to the client device 102, where they are presented to the requesting user.

In instances where the search query results in few search results, the search system 104 executes a second search query based on a reformulated search term. For example, if the search system 104 determines that a number of search results resulting from the initial search query is less than a threshold number of search results, the search system automatically generates a reformulated search term and executes a second search query based on the reformulated search term to provide the user with a greater number of search results. The reformulated search term is broader than the initial search term, thereby resulting in a larger number of search results. For example, the reformulated search teen may include a subset of the keywords included in the initial search term. As another example, the keywords included in the reformulated search term may be assigned weight values that provide less weight to certain keywords during execution of the search query and ranking of search results.

The search system 104 generates the reformulated search term using determined weight values for each of the keywords in the initial search term. Each weight value indicates a probability that the corresponding keyword would be removed by a user when reformulating the search term. For example, the search system 104 may remove the keywords that have a high probability of being removed when reformulation a search. Accordingly, the user is not tasked with reformulating the search term themselves.

The search system 104 determines the weight values for the keywords in a search term based on historical query reformulation data. The historical query reformulation data includes reformulated search query pairs that were identified from historical search queries (i.e., previously executed search queries). For example, the search system 104 includes a data storage that maintains the historical search query data. The search system 104 searches the historical search query data to identify the reformulated search query pairs.

Each reformulated search query pair includes an initial search query and a subsequent search query, in which the subsequent search query was subsequent to the initial search query, and the search term in the subsequent search query includes a subset of the keywords from the search term used in the initial search query. Accordingly, each reformulated search query pair indicates an incident of a user manually generating a reformulated search term. The search system 104 searches the historical search query data to identify the pairs of queries that match the described conditions.

The search system 104 uses the reformulated search query pairs as training data to generate a statistical model. Once generated, the statistical model receives as input a search term and outputs weight values for the keywords included in the search term.

Figure 2:
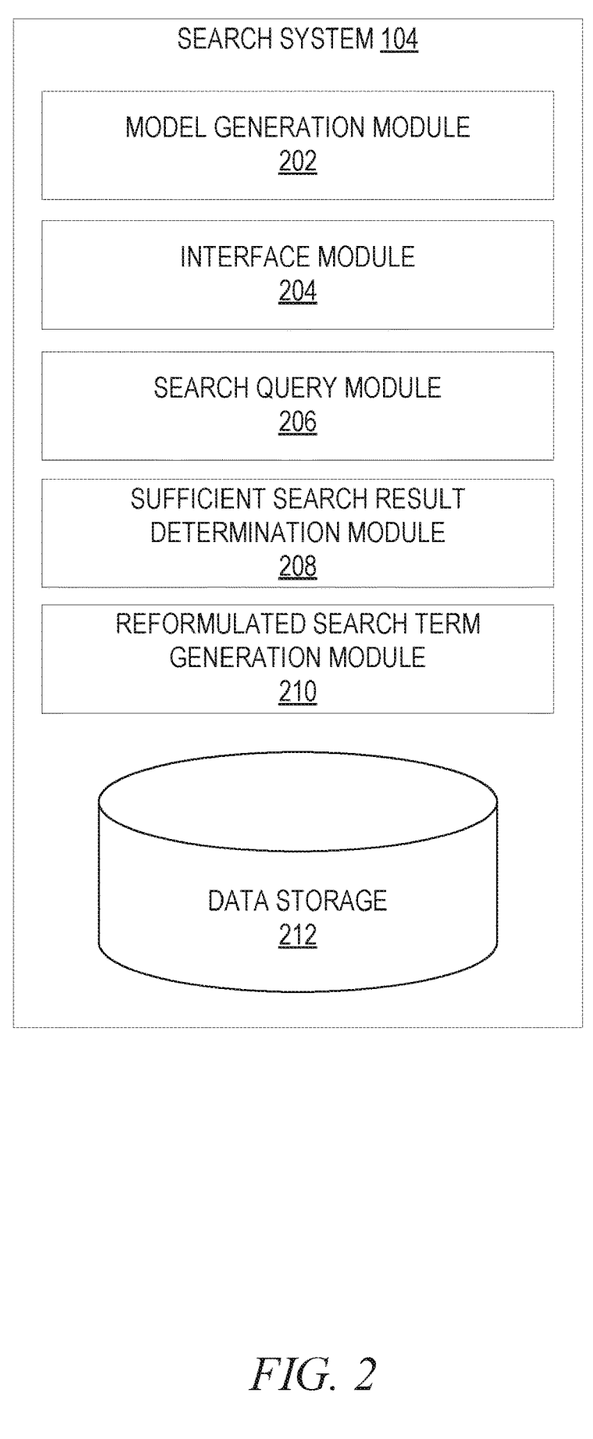
FIG. 2 is a block diagram of a search system, according to some example embodiments.

FIG. 2 is a block diagram of the search system 104, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the search system 104 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the search system 104 includes a model generation module 202, an interface module 204, a search query module 206, a sufficient search result determination module 208, a reformulated search term generation module 210, and a data storage 212.

The model generation module 202 generates a statistical model that outputs weight values for keywords in a given input search term. That is, the generated statistical model receives a search term as input and outputs weight values for the individual keywords included in the search teen. The model generation module 202 generates the statistical model based on historical query reformulation data. The historical query reformulation data includes reformulated search query pairs that were identified from historical search queries (i.e., previously executed search queries). The data storage 212 maintains historical search query data that describes previously executed search queries. This includes the search terms uses, the times and order the search queries were executed, etc. The model generation module 202 communicates with the data storage 212 to access the search query data, and searches the historical search query data to identify the reformulated search query pairs.

Each reformulated search query pair includes an initial search query and a subsequent search query, in which the subsequent search query was subsequent to the initial search query, and the search term in the subsequent search query includes a subset of the keywords from the search term used in the initial search query. Accordingly, each reformulated search query pair indicates an incident of a user manually entering an initial search term, and then reformulating the search term to execute a subsequent search query. The model generation module 202 searches the historical search query data in the data storage 212 to identify the pairs of queries that match these described conditions. The functionality of the model generation module 202 is described in greater detail below in relation to FIG. 3.

The interface module 204 provides a user's client device 102 with a search interface that enables the user to execute a search query for data as well as review the corresponding search results. For example, the interface module 204 provides data to the user's client device 102, that the user's client device 102 uses to provide the search interface. Similarly, the interface module 204 receives data from the user's client device 102 to provide the functionality of the search interface.

The search interface includes user interface elements, such as buttons, text, boxes, drop down boxes, etc., that enable a user to enter search terms to execute search queries. A search term consists of one or more keywords provided by a user to define the scope of the data the user is trying to find. For example, a search term may consist of a single word, such as "restaurants," or provide a more specific scope using multiple words, such as "restaurants within ten miles."

In addition to enabling the user to input a search term, the search interface also presents the user with any search results. For example, the search interface lists the search results and enables the user to select, click, etc., the search results to access secondary information associated with the search result. For example, the search results include a title or other descriptive identifier for the data identified as a result of executing a search query based on the user's provided search term. The user may select one of the search results to access additional details, such as being directed to a corresponding webpage.

The search query module 206 executes a search query based on the search term provided by a user. For example, the search query module 206 executes a search in one or more data stores for data that includes the individual keyword included in the search term. For example, the search query module 206 executes a search query of a data store including data describing restaurants for data that include the search term provided by the user (e.g., Italian restaurant.) As another example, the search query module 206 executes a search query of a data store including data describing job listings for data that includes the search term provided by the user (e.g., dishwasher).

The search query module 206 may execute the search query in the data storage 212 maintained by the search system 104 or a service in which the search system is implemented (e.g., a professional social networking service). Alternatively, the search query module 206 may execute the search query in data stores maintained by web servers, web services, etc., that are in network connection with the search query module 206. The search query module 206 returns any search results of the search query.

The search query module 206 also creates a record of each executed search query. The data storage 212 maintains historical search logs including records of each executed search. The search query module 206 updates the historical search logs in the data storage 212 to record each executed search query. Each record in the historical search logs includes data describing the search query, such as the search term, the timestamp associates with the search query (i.e., the time the search query was executed), a device identifier for the client device 102 that requested the search query, etc. The historical search logs also include data indicating the search results provided to the user, as well as which search results, if any, the user selected.

The sufficient search result determination module 208, determines whether an executed search query resulted in a sufficient number of search results to be presented to the user, or if an additional search should be executed based on reformulated search term. To accomplish this, the sufficient search result determination module 208 determines the number of search results that resulted from a search query and compares the number of search results to a threshold number of search results. If the number of search results meets or exceeds the threshold number of search results, the sufficient search result determination module 208 determines that the search query resulted in a sufficient number of search results to be presented to the user, and the interface module 204 presents the search results on the user's client device 102. Alternatively, if the number of search results is less than the threshold number of search results (i.e., the number of search results does not meet or exceed the threshold number of search results), the sufficient search result determination module 208 determines that the search query did not result in a sufficient number of search results to present to the user. As a result, an additional search will be executed based on a reformulated search term to gather additional search results.

The reformulated search term generation module 210 generates a reformulated search term based on an initial search term. The initial search term is the search term used to execute a search query that resulted in an insufficient number of search results. The reformulated search term generation module 210 reformulates a search term based on weight values determined for each keyword included in the search term. The weight values indicate a probability that a user would remove the given keyword from the search term when generating a reformulated search term. The reformulated search term generation module 210 determines the weight values for each keyword using the statistical model generated by the model generation module 202. That is, the reformulated search term generation module 210 uses the search term as input in the statistical model, resulting in the output of the weight values for each keyword included in the search term.

The reformulated search term generation module 210 uses the weight values to generate a reformulated search term. A reformulated search term is an adjusted search term that is intended to result in additional search results. For example, the reformulated search term may include a subset of the keywords from the initial search term, thereby broadening the scope of the resulting search query. As another example, the reformulated search term may include all of the same keywords, however the varying keywords are given lower weights, thereby broadening the scope of the resulting search query.

The reformulated search term generation module 210 uses the weight values to select one or more of the keywords from the search term to omit in the reformulated search term. For example, the reformulated search term generation module 210 may omit each keyword that is determined to have a high probability of being removed when reformulating a search term. The reformulated search term generation module 210 accomplishes this by comparing the weight values to a threshold weight value and removing any of the keywords with a weight value that transgresses (e.g., meets or exceeds) the threshold value. In some embodiments, the reformulated search term generation module 210 may remove all of the keywords that have weight values that transgress the threshold value. Alternatively, the reformulated search term generation module 210 may remove up to a maximum number of the keywords that have weight values that transgress the threshold value. In some embodiments, the reformulated search term generation module 210 may remove the keyword or a predetermined number of keywords that have the highest determined probability of being removed by a user when reformulating the search term, regardless of whether the weight value transgresses the threshold.

In addition or alternatively to removing keywords when generating a reformulated search term, the reformulated search term generation module 210 may also assign the weight values to the their corresponding keywords in the reformulated search term. The assigned weight values are used by the search query module 206 when executing a search query. For example, the search query module 206 may use the assigned weight values when searching for corresponding data and/or ranking the search results. As a result, keywords that have a high probability of having been removed by users when generating a reformulated search term will still be considered when identifying search results, however the impact of these keywords will be reduced, thereby increasing the number of resulting search terms.

The reformulated search term generation module 210 provides the reformulated search term to the search query module 206. The search query module 206 then executes a second search query based on the reformulated search term. The corresponding search results are presented to the user by the interface module 204. The search results may be presented with an indication that they include search results gathered using a reformulated search term.

Figure 3:
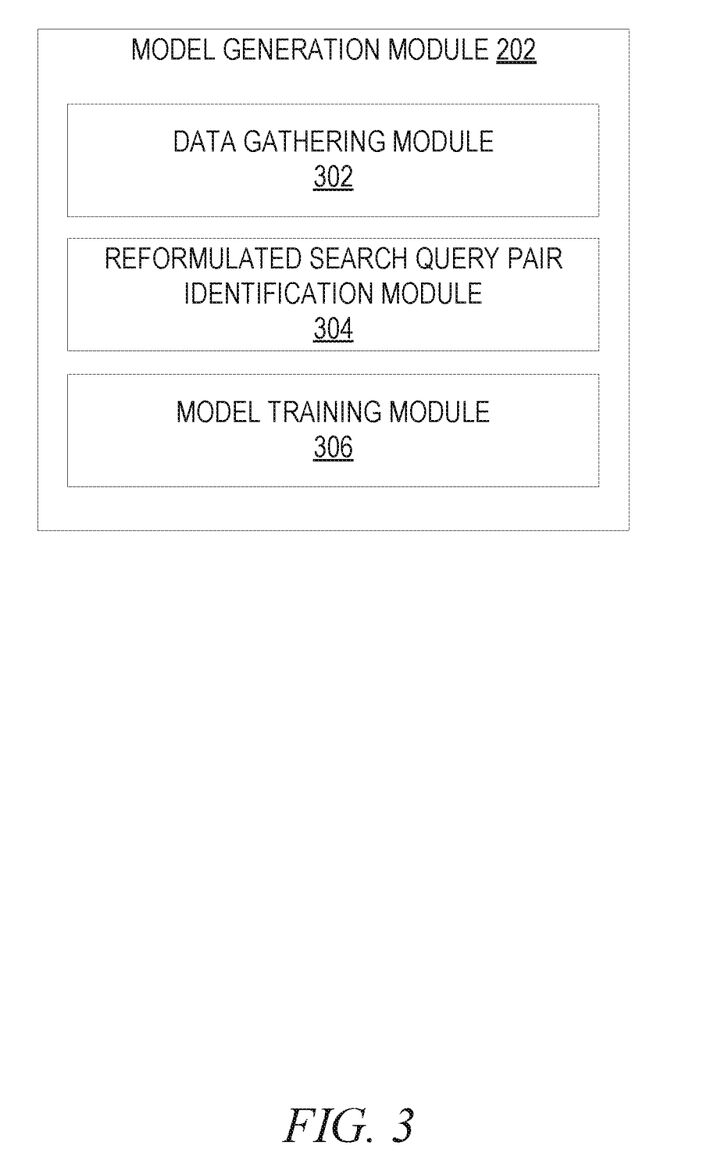
FIG. 3 is a block diagram of a model generation module, according to some example embodiments.

FIG. 3 is a block diagram of the model generation module 202 according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the model generation module 202 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the model generation module 202 includes a data gathering module 302, a reformulated search query pair identification module 304, and a model training module 306. The data gathering module 302 gathers historical search query data from the data storage 212. The historical search query data includes data describing previously executed search queries. For example, the historical search query data includes data describing the user and/or client device 102 that executed the search query, the search term used to execute the search query, the day, time, and or order in which the search queries were executed, etc.

The reformulated search query pair identification module 304 identifies reformulated search query pairs from the historical search query data. A reformulated search query pair is a pair of subsequent search queries in which a user reformulated a previously executed search to achieve additional search results. That is, the user executed a first search query based on an initial search term and then executed a reformulated search query based on a revised search term to receive additional search results. The reformulated search query pair identification module 304 identifies a search term as being revised as a reformulated search term if the search term includes a subset of the keywords included in the search term used in previously executed search query. That is, a search term is identified as being a reformulated search term if the user removed at least one keyword that was included in the previous search term.

The reformulated search query pairs identified from the historical search query data represent historical search query reformulation data. The historical search query reformulation data describes how users previously handled reformulating search queries to receive additional search results. That is, the historical search query reformulation data indicates what keywords the users chose to remove from a previous search term to generate a reformulated search term that would result in more search results.

The model training module 306 uses the historical search query reformulation data to train a statistical model that outputs weight values for keywords in a given input search term. That is, the trained statistical model receives a search term as input and outputs weight values for the individual keywords included in the search term. The weight value for each keyword indicate a probability that a user would have removed the keyword when generating a reformulated search term.

The model training module 306 trains the statistical model by analyzing the keywords in the reformulated search term pairs to determine the impact that various given signals have on the probability that a user will remove or keep a keyword. For example, the model training module 306 may analyze the reformulated search term pairs based on signals such as the length of the keywords, whether the keywords are capitalized, whether the keyword designates a specialty (e.g., PhD, Esquire, etc.), whether the keyword designates a geographic location, whether the keyword designates a suffix or prefix (e.g., Mrs., Mr., Dr., LLC, Ltd., etc.), whether the keyword designates a company name, placement of the keyword in a search term, etc. Once trained, the statistical model analyzes a given keyword based on the signals to determine an individual score for each signal. These individual scores are then used to calculate a cumulative score, which is the basis for the weight value assigned to the keyword.

Figure 4:
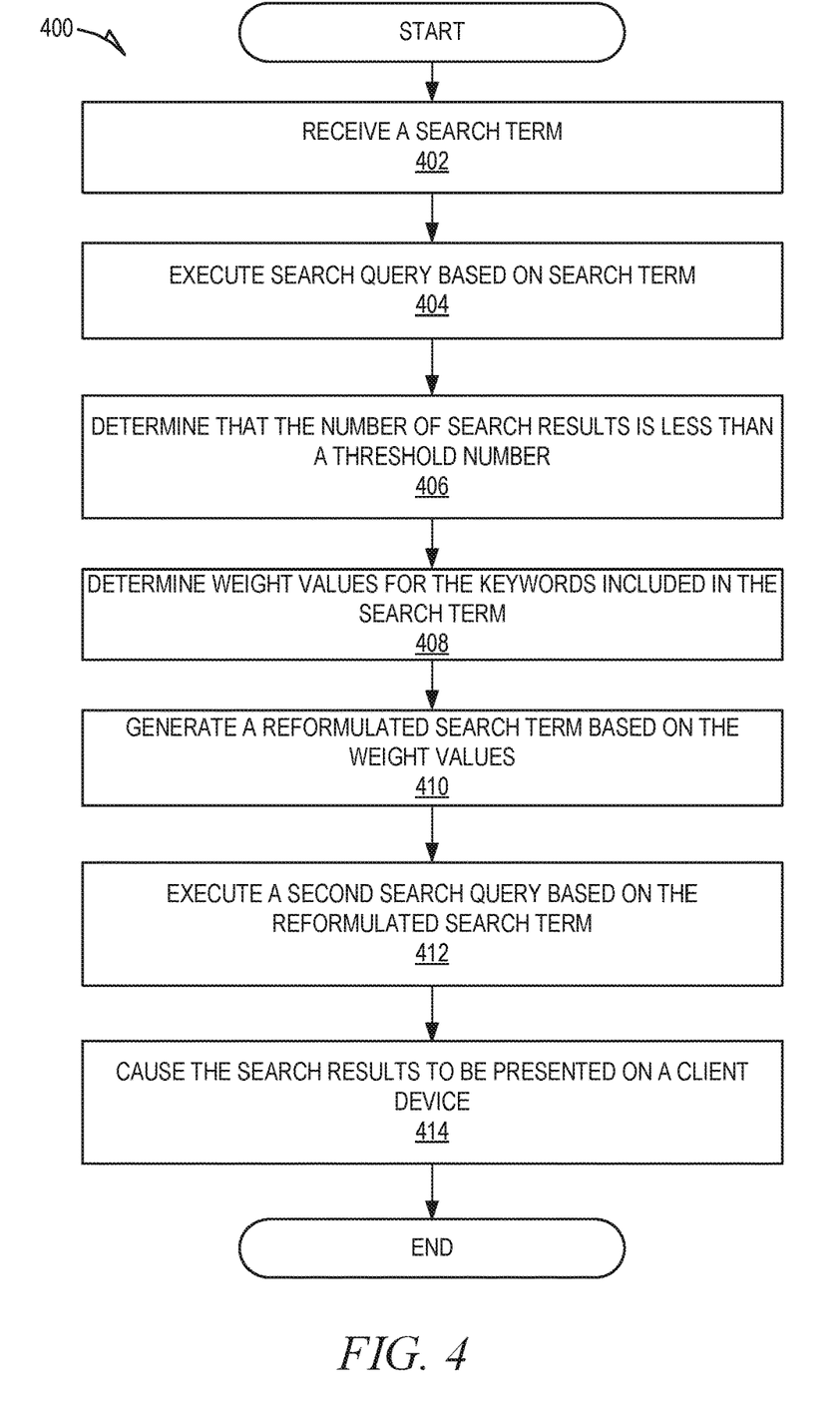
FIG. 4 is a flowchart showing an example method of expanding search queries using query term weighting, according to certain example embodiments.

FIG. 4 is a flowchart showing an example method 400 of expanding search queries using query term weighting, according to certain example embodiments. The method 400 may be embodied in computer readable instructions for execution by one or more processors such that the operations of the method 400 may be performed in part or in whole by the search system 104; accordingly, the method 400 is described below by way of example with reference thereto. However, it shall be appreciated that at least some of the operations of the method 400 may be deployed on various other hardware configurations and the method 400 is not intended to be limited to the search system 104.

At operation 402, the interface module 204 receives a search term. The interface module 204 provides a user's client device 102 with a search interface that enables the user to execute a search query for data as well as review the corresponding search results. For example, the interface module 204 provides data to the user's client device 102, that the user's client device 102 uses to provide the search interface. Similarly, the interface module 204 receives data from the user's client device 102 to provide the functionality of the search interface.

The search interface includes user interface elements, such as buttons, text, boxes, drop down boxes, etc., that enable a user to enter search terms to execute search queries. A search term consists of one or more keywords provided by a user to define the scope of the data the user is trying to find. For example, a search term may consist of a single word, such as "restaurants," or provide a more specific scope using multiple words, such as "restaurants within ten miles."

At operation 404, the search query module 206 executes a search query based on the search term. The search query module 206 executes the search query in one or more data stores for data that includes the individual keyword included in the search term. For example, the search query module 206 executes a search query of a data store including data describing restaurants for data that include the search term provided by the user (e.g., Italian restaurant.) As another example, the search query module 206 executes a search query of a data store including data describing job listings for data that includes the search term provided by the user (e.g., dishwasher).

The search query module 206 may execute the search query in the data storage 212 maintained by the search system 104 or a service in which the search system is implemented (e.g., a professional social networking service). Alternatively, the search query module 206 may execute the search query in data stores maintained by web servers, web services, etc., that are in network connection with the search query module 206. The search query module 206 returns any search results of the search query.

The search query module 206 also creates a record of each executed search query. The data storage 212 maintains historical search logs including records of each executed search. The search query module 206 updates the historical search logs in the data storage 212 to record each executed search query. Each record in the historical search logs includes data describing the search query, such as the search term, the timestamp associates with the search query (i.e., the time the search query was executed), a device identifier for the client device 102 that requested the search query, etc. The historical search logs also include data indicating the search results provided to the user, as well as which search results, if any, the user selected.

At operations 406, the sufficient search result determination module 208 determines that the number of search results is less than a threshold number. The sufficient search result determination module 208, determines whether an executed search query resulted in a sufficient number of search results to be presented to the user, or if an additional search should be executed based on reformulated search term. To accomplish this, the sufficient search result determination module 208 determines the number of search results that resulted from a search query and compares the number of search results to a threshold number of search results. If the number of search results meets or exceeds the threshold number of search results, the sufficient search result determination module 208 determines that the search query resulted in a sufficient number of search results to be presented to the user, and the interface module 204 presents the search results on the user's client device 102. Alternatively, if the number of search results is less than the threshold number of search results (i.e., the number of search results does not meet or exceed the threshold number of search results), the sufficient search result determination module 208 determines that the search query did not result in a sufficient number of search results to present to the user. As a result, an additional search will be executed based on a reformulated search term to gather additional search results.

At operation 408, the reformulated search term generation module 210 determines weight values for the keywords included in the search term. The weight values indicate a probability that a user would remove the given keyword from the search term when generating a reformulated search term. The reformulated search term generation module 210 determines the weight values for each keyword using the statistical model generated by the model generation module 202. That is, the reformulated search term generation module 210 uses the search term as input in the statistical model, resulting in the output of the weight values for each keyword included in the search term.

At operation 410, the reformulated search term generation module 210 generates a reformulated search term based on the weight values. A reformulated search term is an adjusted search term that is intended to result in additional search results. For example, the reformulated search term may include a subset of the keywords from the initial search term, thereby broadening the scope of the resulting search query. As another example, the reformulated search term may include all of the same keywords, however the varying keywords are given lower weights, thereby broadening the scope of the resulting search query.

The reformulated search term generation module 210 uses the weight values to select one or more of the keywords from the search term to omit in the reformulated search term. For example, the reformulated search term generation module 210 may omit each keyword that is determined to have a high probability of being removed when reformulating a search term. The reformulated search term generation module 210 accomplishes this by comparing the weight values to a threshold weight value and removing any of the keywords with a weight value that transgresses (e.g., meets or exceeds) the threshold value. In some embodiments, the reformulated search term generation module 210 may remove all of the keywords that have weight values that transgress the threshold value. Alternatively, the reformulated search term generation module 210 may remove up to a maximum number of the keywords that have weight values that transgress the threshold value. In some embodiments, the reformulated search term generation module 210 may remove the keyword or a predetermined number of keywords that have the highest determined probability of being removed by a user when reformulating the search term, regardless of whether the weight value transgresses the threshold.

In addition or alternatively to removing keywords when generating a reformulated search term, the reformulated search term generation module 210 may also assign the weight values to the their corresponding keywords in the reformulated search term. The assigned weight values are used by the search query module 206 when executing a search query. For example, the search query module 206 may use the assigned weight values when searching for corresponding data and/or ranking the search results. As a result, keywords that have a high probability of having been removed by users when generating a reformulated search term will still be considered when identifying search results, however the impact of these keywords will be reduced, thereby increasing the number of resulting search terms.

The reformulated search term generation module 210 provides the reformulated search term to the search query module 206. At operation 412, the search query module 206 executes a second search query based on the reformulated search term. The corresponding search results are presented to the user by the interface module 204, and at operations 414, the interface module 204 cause the search results to be presented on a client device 102 of the user that entered the search query. For example, the search results are presented on a search interface on a display of the client device 102. The search results may be presented with an indication that they include search results gathered using a reformulated search term.

Figure 5:
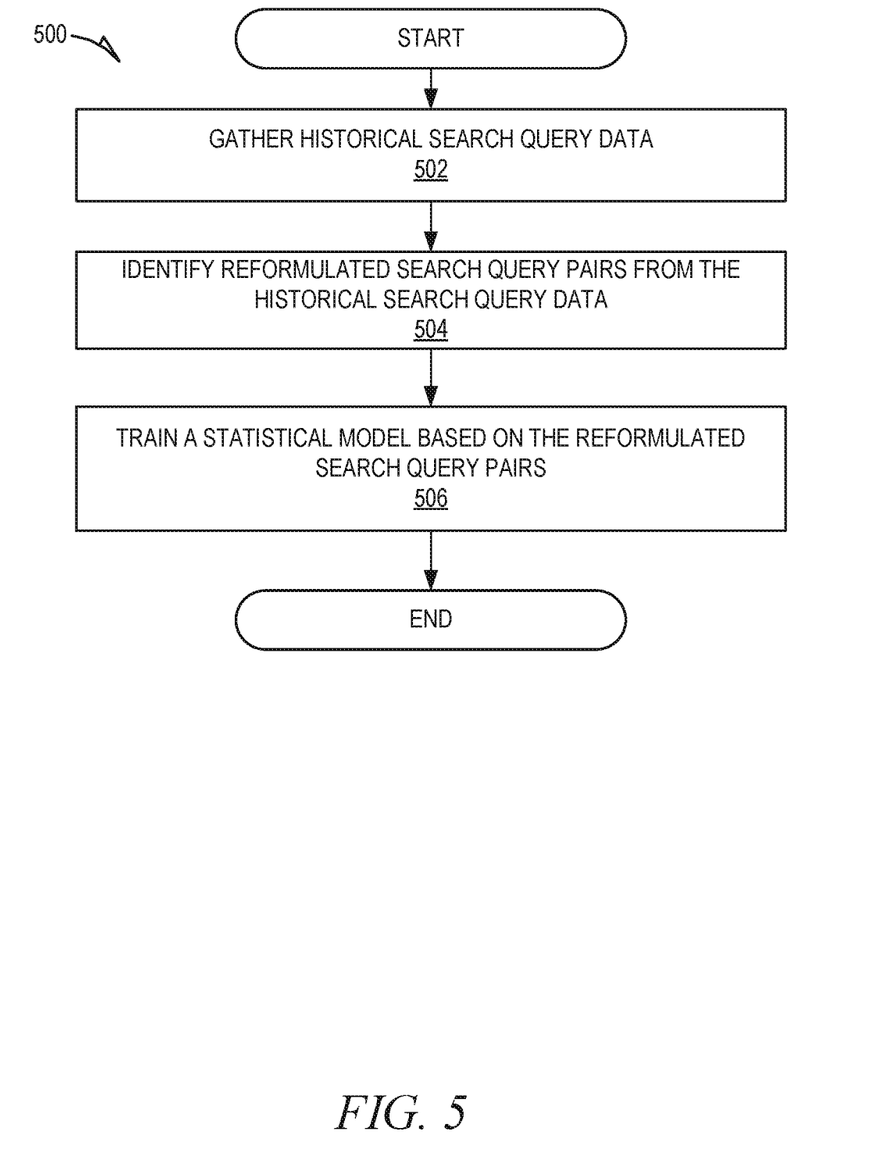
FIG. 5 is a flowchart showing an example method of generating a statistical model, according to certain example embodiments.

FIG. 5 is a flowchart showing an example method 500 of generating a statistical model, according to certain example embodiments. The method 500 may be embodied in computer readable instructions for execution by one or more processors such that the operations of the method 500 may be performed in part or in whole by the search system 104; accordingly, the method 500 is described below by way of example with reference thereto. However, it shall be appreciated that at least some of the operations of the method 500 may be deployed on various other hardware configurations and the method 500 is not intended to be limited to the search system 104.

At operation 502, the data gathering module 302 gathers historical search query data. The data gathering module 302 gathers historical search query data from the data storage 212. The historical search query data includes data describing previously executed search queries. For example, the historical search query data includes data describing the user and/or client device 102 that executed the search query, the search term used to execute the search query, the day, time, and or order in which the search queries were executed, etc.

At operation 504, the reformulated search query pair identification module 304 identifies reformulated search query pairs from the historical search query data. A reformulated search query pair is a pair of subsequent search queries in which a user reformulated a previously executed search to achieve additional search results. That is, the user executed a first search query based on an initial search term and then executed a reformulated search query based on a revised search term to receive additional search results. The reformulated search query pair identification module 304 identifies a search term as being revised as a reformulated search term if the search term includes a subset of the keywords included in the search term used in previously executed search query. That is, a search term is identified as being a reformulated search term if the user removed at least one keyword that was included in the previous search term.

The reformulated search query pairs identified from the historical search query data represent historical search query reformulation data. The historical search query reformulation data describes how users previously handled reformulating search queries to receive additional search results. That is, the historical search query reformulation data indicates what keywords the users chose to remove from a previous search term to generate a reformulated search term that would result in more search results.

At operations 506, the model training module 306 trains a statistical model based on the reformulated search query pairs. The model training module 306 uses the historical search query reformulation data to train a statistical model that outputs weight values for keywords in a given input search term. That is, the trained statistical model receives a search term as input and outputs weight values for the individual keywords included in the search term. The weight value for each keyword indicate a probability that a user would have removed the keyword when generating a reformulated search term.

The model training module 306 trains the statistical model by analyzing the keywords in the reformulated search term pairs to determine the impact that various given signals have on the probability that a user will remove or keep a keyword. For example, the model training module 306 may analyze the reformulated search term pairs based on signals such as the length of the keywords, whether the keywords are capitalized, whether the keyword designates a specialty (e.g., PhD, Esquire, etc.), whether the keyword designates a geographic location, whether the keyword designates a suffix or prefix (e.g., Mrs., Mr., Dr., LLC, Ltd., etc.), whether the keyword designates a company name, placement of the keyword in a search term, etc. Once trained, the statistical model analyzes a given keyword based on the signals to determine an individual score for each signal. These individual scores are then used to calculate a cumulative score, which is the basis for the weight value assigned to the keyword.

Software Architecture

Figure 6:
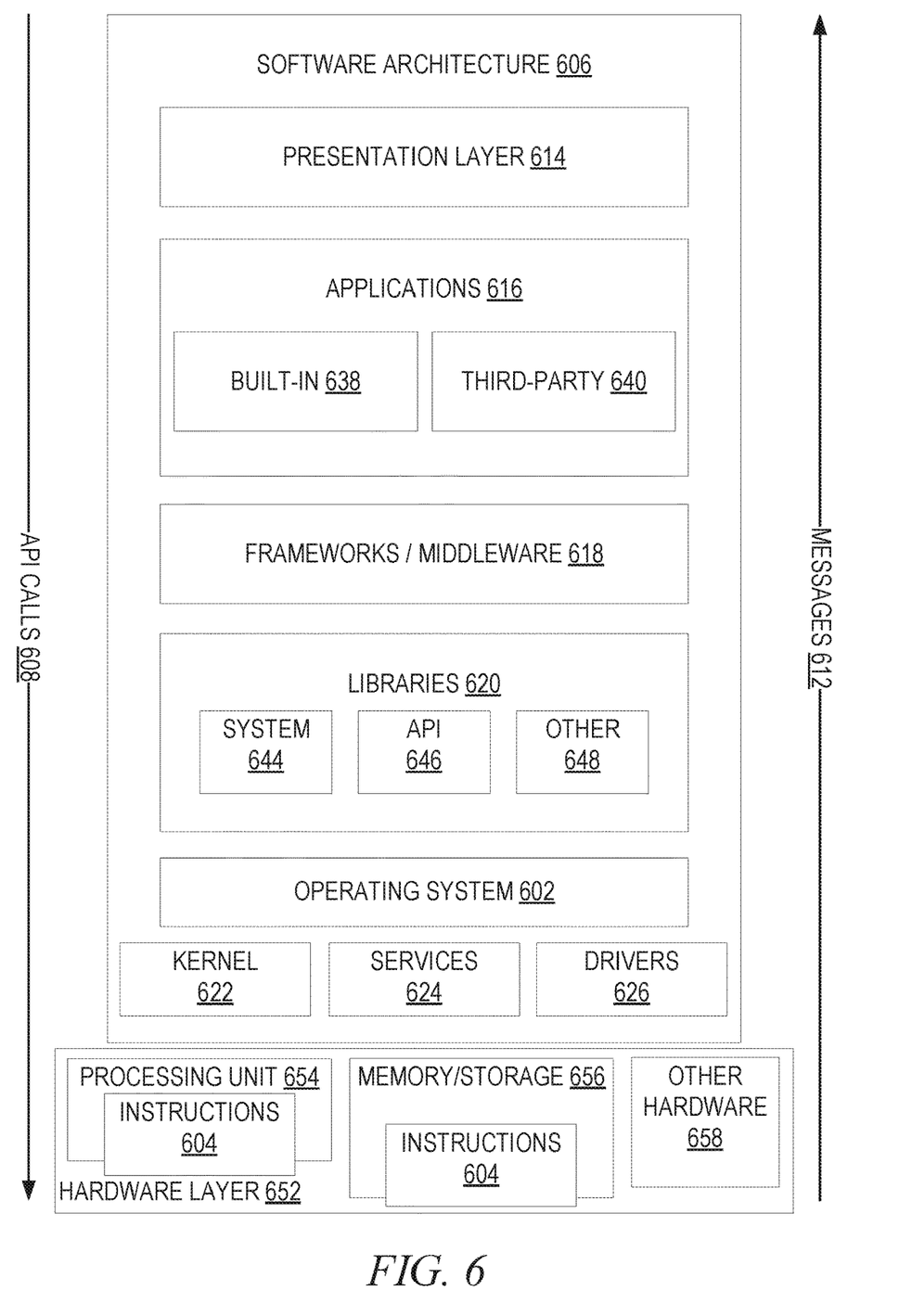
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules memory/storage 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke API calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624 and/or drivers 626), libraries 620, and frameworks/middleware 618 to create user interfaces to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
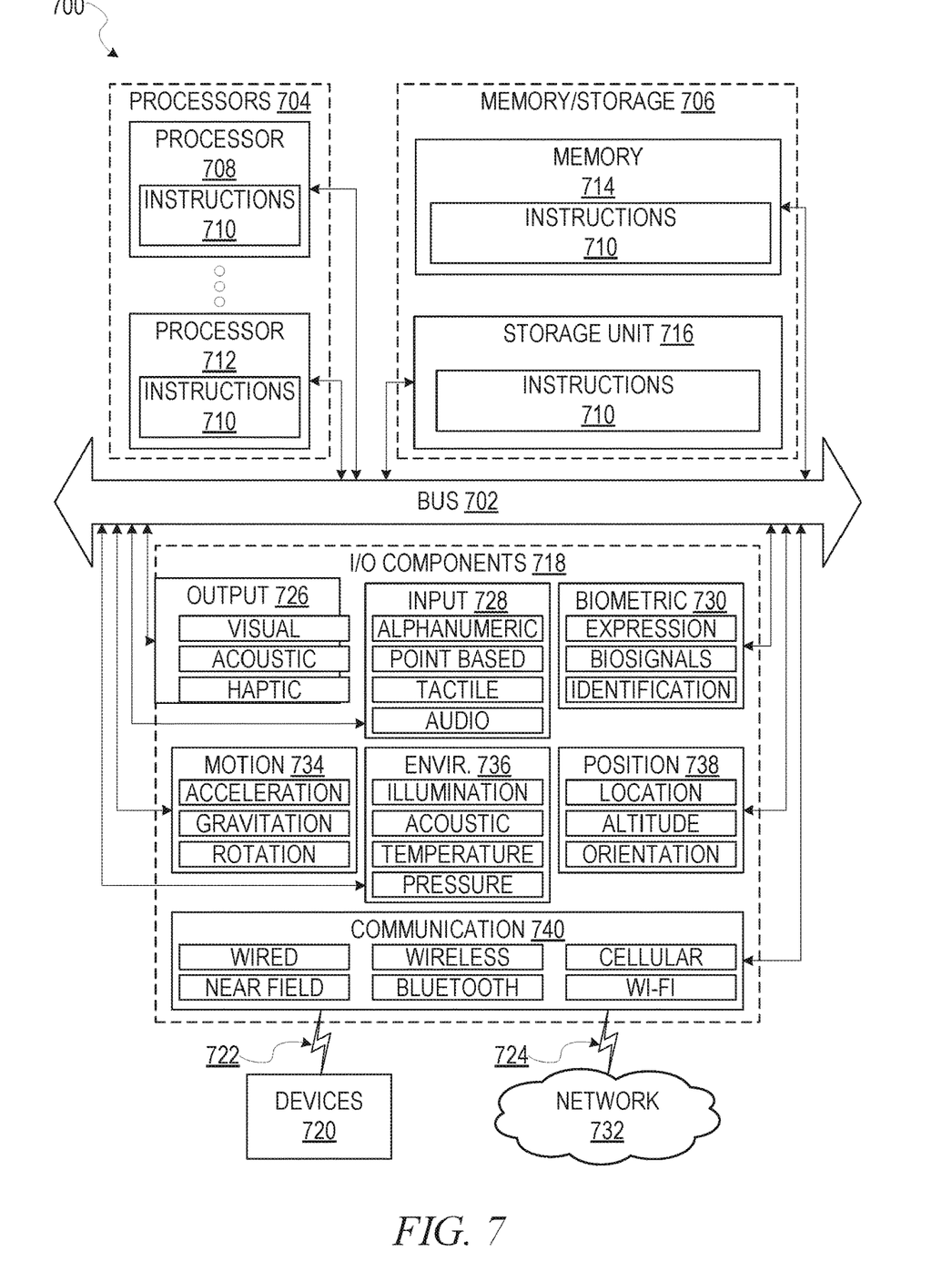
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and 110 components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device may be, but is not limited to, a mobile phone, desktop computer, laptop, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 704 (sometimes referred to as "cores") that may execute instructions 710 contemporaneously.

What is claimed is:

1. A method comprising:
receiving, by a processor from a client device, a search term comprising at least a first keyword and a second keyword;
executing, by the processor a search query based on the search term, yielding search results;
in response to determining that a number of the search results is less than a threshold number, determining by the processor, based on a statistical model trained using historical query reformulation data, a first weight value for the first keyword and a second weight value for the second keyword, the first weight value indicating a probability that the first keyword would be removed when reformulating the search term and the second weight value indicating a probability that the second keyword would be removed when reformulating the search term, wherein the historical query reformulation data includes a plurality of reformulated search query pairs representing incidents of query reformulations performed by users, each reformulated search query pair from the plurality of reformulated search query pairs including an initial search query and a subsequent search query that was executed subsequent to the initial search query, and a search term used for the subsequent search query including a subset of keywords from a search term used for the initial search query, the statistical model being generated based on the plurality of reformulated search query pairs;

generating, by the processor, a reformulated search term based on the first weight value and the second weight value, the reformulated search term including the first search keyword and not including the second keyword, wherein the generating the reformulated search term comprises:

comparing the first weight value and the second weight value to a threshold weight value, yielding comparison; and excluding the second keyword from the reformulated search term based on the comparison;

executing a second search query based on the reformulated search term, yielding second search results; and causing presentation of at least a portion of the second search results on the client device.

2. The method of claim 1, wherein generating the reformulated search term comprises:
determining that the second weight value is below the threshold weight value; and
removing the second keyword from the search term.

3. The method of claim 1, wherein generating the reformulated search term comprises associating the first weight value to the first keyword and associating the second weight value to the second keyword.

4. The method of claim 3, wherein the second search results are ranked based on the first weight value associated with the first keyword, and the second weight value associated with the second keyword.

5. The method of claim 1, further comprising:
the statistical model outputting weight values for keywords included in an input search term.

6. The method of claim 1, wherein causing presentation of at least the portion of the second search results on the client device comprises:
transmitting, to the client device, data describing the at least the portion of the second search results, wherein the at least the portion of the second search results are presented within a search interface on a display of the client device.

7. A search system comprising:
one or more computer processors; and
one or more computer-readable mediums storing instructions that, when executed by the one or more computer processors, cause the search system to perform operations comprising:
receiving, from a client device, a search term comprising at least a first keyword and a second keyword;
executing a search query based on the search term, yielding search results;
in response to determining that a number of the search results is less than a threshold number, determining, based on a statistical model trained using historical query reformulation data, a first weight value for the first keyword and a second weight value for the second keyword, the first weight value indicating a probability that the first keyword would be removed when reformulating the search term and the second weight value indicating a probability that the second keyword would be removed when reformulating the search term, wherein the historical query reformulation data includes a plurality of reformulated search query pairs representing incidents of query reformulations performed by users, each reformulated search query pair from the plurality of reformulated search query pairs including an initial search query and a subsequent search query that was executed subsequent to the initial search query, and a search term used for the subsequent search query including a subset of keywords from a search term used for the initial search query, the statistical model being generated based on the plurality of reformulated search query pairs;

generating a reformulated search term based on the first weight value and the second weight value, the reformulated search term including the first search keyword and not including the second keyword, wherein the generating the reformulated search term comprises:

comparing the first weight value and the second weight value to a threshold weight value, yielding comparison; and excluding the second keyword from the reformulated search term based on the comparison;

executing a second search query based on the reformulated search term, yielding second search results; and causing presentation of at least a portion of the second search results on the client device.

8. The search system of claim 7, wherein generating the reformulated search term comprises:
determining that the second weight value is below the threshold weight value; and
removing the second keyword from the search term.

9. The search system of claim 7, wherein generating the reformulated search term comprises associating the first weight value to the first keyword and associating the second weight value to the second keyword.

10. The search system of claim 9, wherein the second search results are ranked based on the first weight value associated with the first keyword, and the second weight value associated with the second keyword.

11. The search system of claim 7, the operations further comprising:
the statistical model outputting weight values for keywords included in an input search term.

12. The search system of claim 7, wherein causing presentation of at least the portion of the second search results on the client device comprises:
transmitting, to the client device, data describing the at least the portion of the second search results, wherein the at least the portion of the second search results are presented within a search interface on a display of the client device.

13. A non-transitory computer-readable medium storing instructions that, when executed by one or more computer processors of a search system, cause the search system to perform operations comprising:
receiving, from a client device, a search term comprising at least a first keyword and a second keyword;
executing a search query based on the search term, yielding search results;
in response to determining that a number of the search results is less than a threshold number, determining, based on a statistical model trained using historical query reformulation data, a first weight value for the first keyword and a second weight value for the second keyword, the first weight value indicating a probability that the first keyword would be removed when reformulating the search term and the second weight value indicating a probability that the second keyword would be removed when reformulating the search term, wherein the historical query reformulation data includes a plurality of reformulated search query pairs representing incidents of query reformulations performed by users, each reformulated search query pair from the plurality of reformulated search query pairs including an initial search query and a subsequent search query that was executed subsequent to the initial search query, and a search term used for the subsequent search query including a subset of keywords from a search term used for the initial search query, the statistical model being generated based on the plurality of reformulated search query pairs;

generating a reformulated search term based on the first weight value and the second weight value, the reformulated search term including the first search keyword and not including the second keyword, wherein the generating the reformulated search term comprises:

comparing the first weight value and the second weight value to a threshold weight value, yielding comparison; and excluding the second keyword from the reformulated search term based on the comparison;

executing a second search query based on the reformulated search term, yielding second search results; and causing presentation of at least a portion of the second search results on the client device.

14. The non-transitory computer-readable medium of claim 13, wherein generating the reformulated search term comprises:

determining that the second weight value is below the threshold weight value; and removing the second keyword from the search term.

15. The non-transitory computer-readable medium of claim 13, wherein generating the reformulated search term comprises associating the first weight value to the first keyword and associating the second weight value to the second keyword.

16. The non-transitory computer-readable medium of claim 15, wherein the second search results are ranked based on the first weight value associated with the first keyword, and the second weight value associated with the second keyword.

17. The non-transitory computer-readable medium of claim 13, the operations further comprising:

the statistical model outputting weight values for keywords included in an input search term.

18. The non-transitory computer-readable medium of claim 13, wherein causing presentation of at least the portion of the second search results on the client device comprises:

transmitting, to the client device, data describing the at least the portion of the second search results, wherein the at least the portion of the second search results are presented within a search interface on a display of the client device.

* * * * *